(12) United States Patent
Liu et al.

(10) Patent No.: US 12,061,773 B2
(45) Date of Patent: Aug. 13, 2024

(54) METHOD AND APPARATUS FOR DETERMINING SELECTED TARGET, DEVICE, AND STORAGE MEDIUM

(71) Applicant: Tencent Technology (Shenzhen) Company Limited, Shenzhen (CN)

(72) Inventors: Peicheng Liu, Shenzhen (CN); Xiaohao Liu, Shenzhen (CN); Shan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/830,647

(22) Filed: Jun. 2, 2022

(65) Prior Publication Data

US 2022/0291791 A1 Sep. 15, 2022

Related U.S. Application Data

(63) Continuation of application No. PCT/CN2021/122168, filed on Sep. 30, 2021.

(30) Foreign Application Priority Data

Oct. 29, 2020 (CN) .......................... 202011182873.0

(51) Int. Cl.
   *G06F 3/048* (2013.01)
   *G06F 3/04817* (2022.01)
   *G06F 3/0482* (2013.01)

(52) U.S. Cl.
   CPC ........ *G06F 3/0482* (2013.01); *G06F 3/04817* (2013.01)

(58) Field of Classification Search
   CPC ............... G06F 3/0482; G06F 3/04817; G06F 3/04842; G06F 3/0484
   See application file for complete search history.

(56) References Cited

U.S. PATENT DOCUMENTS 6,384,841 B1    5/2002  Lebovitz et al.
8,453,060 B2 *  5/2013  Ofek .................. G06F 16/29
                                          715/757
(Continued)

FOREIGN PATENT DOCUMENTS

CN    102831817 A    12/2012
CN    105472313 A     4/2016
(Continued)

OTHER PUBLICATIONS

International Search Report and Written Opinion with English Translation for International Patent Application No. PCT/CN2021/122168 dated Dec. 30, 2021, 12 pgs.

(Continued)

*Primary Examiner* — Thanh T Vu
(74) *Attorney, Agent, or Firm* — Crowell & Moring LLP

(57) ABSTRACT

A method and an apparatus for determining a selected target, a device, and a storage medium belong to the field of computer technologies. The method includes: displaying a thumbnail map, the thumbnail map displaying at least one target; presenting, in a target presentation menu, without overlap, and based on a trigger instruction targeting a combined stack response area in the thumbnail map, at least two stacked targets in the combined stack response area, the combined stack response area being a combined area of trigger response areas respectively corresponding to the at least two stacked targets in the thumbnail map; and determining a first target presented in the target presentation menu as a selected target based on a target trigger instruction targeting the first target, the first target being one of the at least two stacked targets.

16 Claims, 8 Drawing Sheets

(56) References Cited

U.S. PATENT DOCUMENTS

| | | | |
|---|---|---|---|
| 2001/0040984 A1 | 11/2001 | Kambe et al. | |
| 2008/0066000 A1 | 3/2008 | Ofek et al. | |
| 2009/0077498 A1 | 3/2009 | Shima | |
| 2009/0284551 A1* | 11/2009 | Stanton | G06F 3/14 345/629 |
| 2015/0369623 A1* | 12/2015 | Blumenberg | G06T 3/40 701/532 |
| 2016/0062617 A1 | 3/2016 | Isaacs | |
| 2017/0374507 A1 | 12/2017 | Jeon et al. | |
| 2018/0165851 A1* | 6/2018 | Apte | G06F 40/177 |

FOREIGN PATENT DOCUMENTS

| | | |
|---|---|---|
| CN | 106289298 A | 1/2017 |
| CN | 112306332 A | 2/2021 |
| JP | 2004-295577 A | 10/2004 |
| KR | 10-2010-0051085 A | 5/2010 |
| TW | 201107717 A | 3/2011 |
| TW | 201324193 A | 6/2013 |
| TW | 201903593 A | 1/2019 |

OTHER PUBLICATIONS

Taiwan Office Action with English Translation of Concise Explanation of Relevance for Taiwanese Patent Application No. 11120370270 dated Apr. 18, 2022, 9 pgs.

Chinese Office Action with English Translation of Concise Explanation of Relevance for Chinese Patent Application No. 202011182873.0 dated Jul. 18, 2022, 8 pgs.

Japanese Office Action with English Translation of Notice of reasons for refusal for Japanese Patent Application No. 2022-572322 dated Dec. 18, 2023, 7 pgs.

Korean Office Action for Korean Patent Application No. 2022701872 dated Jun. 19, 2024, with English translation of summary, 9 pgs.

* cited by examiner

METHOD AND APPARATUS FOR DETERMINING SELECTED TARGET, DEVICE, AND STORAGE MEDIUM

RELATED APPLICATION

This application is a continuation application of PCT Patent Application No. PCT/CN2021/122168, filed on Sep. 30, 2021, which claims priority to Chinese Patent Application No. 202011182873.0, filed with the China National Intellectual Property Administration, PRC on Oct. 29, 2020, each of which is incorporated herein by reference in its entirety.

FIELD OF THE TECHNOLOGY

Embodiments of this disclosure relate to the field of computer technologies, and in particular, to a method and an apparatus for determining a selected target, a device, and a storage medium.

BACKGROUND OF THE DISCLOSURE

As computer technologies are developed, more and more application programs can display thumbnail maps on display interfaces, and the thumbnail map can display multiple targets that may be selected by interactive objects. Because a display area of the thumbnail map is limited, multiple objects are prone to be stacked on each other in the thumbnail map.

In the related art, when a trigger operation performed on a response area corresponding to multiple stacked targets is detected, a target of the multiple stacked targets that is located on top is directly determined as a selected target. In this process, the target that is located on top may not be a target that an interactive object really wants to select. Or the desired target may be missed as it may be overlapped with other targets. Therefore, it is inaccurate to directly determine a target of multiple stacked targets that is located on top as a selected target.

SUMMARY

Embodiments of this disclosure provide a method and an apparatus for determining a selected target, a device, and a storage medium, to improve the accuracy of determining a selected target. The technical solutions are as follows.

According to one aspect, an embodiment of this disclosure provides a method for determining a selected target, including:

displaying a thumbnail map, the thumbnail map displaying at least one target;

independently presenting, based on a trigger instruction for a first stack response area in the thumbnail map, at least two stacked targets corresponding to the first stack response area in a target presentation menu, the first stack response area being a combined area of trigger response areas respectively corresponding to the at least two stacked targets in the thumbnail map; and determining a first target independently presented in the target presentation menu as a selected target based on a trigger instruction for the first target, the first target being one of the at least two stacked targets.

According to another aspect, an apparatus for determining a selected target is provided, including:

a display unit, configured to display a thumbnail map, the thumbnail map displaying at least one target;

a presentation unit, configured to independently present, based on a trigger instruction for a first stack response area in the thumbnail map, at least two stacked targets corresponding to the first stack response area in a target presentation menu, the first stack response area being a combined area of trigger response areas respectively corresponding to the at least two stacked targets in the thumbnail map; and a determining unit, configured to determine a first target independently presented in the target presentation menu as a selected target based on a trigger instruction for the first target, the first target being one of the at least two stacked targets.

According to another aspect, a computer device is provided, including a processor and a memory, the memory storing at least one piece of program code, and the at least one piece of program code being loaded and executed by the processor to cause the computer device to perform the foregoing method for determining a selected target.

According to another aspect, a non-transitory computer-readable storage medium is further provided, storing at least one piece of program code, the at least one piece of program code being loaded and executed by a processor to cause a computer to perform the foregoing method for determining a selected target.

According to another aspect, a computer program product or a computer program is provided, including computer instructions, the computer instructions being stored in a non-transitory computer-readable storage medium, a processor of a computer device reading the computer instructions from the computer-readable storage medium, and the processor executing the computer instructions to cause the computer device to perform the foregoing method for determining a selected target.

In the embodiments of this application, based on the trigger instruction for the stack response area, the target presentation menu independently presents stacked targets corresponding to the stack response area, and then a triggered target of the independently presented targets is determined as a selected target. In this process, a target independently presented in the target presentation menu can be accurately selected, and it is very accurate to determine a triggered target of the independently presented targets as a selected target.

DESCRIPTION OF EMBODIMENTS

To make objectives, technical solutions, and advantages of this application clearer, the following further describes implementations of this application in detail with reference to the accompanying drawings.

The following explains several terms involved in the embodiments of this application.

Virtual environment: an environment provided (or displayed) when an application program runs on a terminal. The virtual environment is an environment created for a virtual object to perform an activity. The virtual environment may be a two-dimensional virtual environment, a 2.5-dimensional virtual environment, or a three-dimensional virtual environment. The virtual environment may be a simulated environment of a real world, or may be a semi-simulated semi-fictional environment, or may be an entirely fictional/simulated environment.

Virtual object: a virtual object is a movable object in a virtual environment. The movable object may be a virtual character, a virtual animal, or a cartoon character. An interactive object can manipulate a virtual object through a peripheral component or by tapping a touchscreen. Each virtual object has a shape and a volume in the virtual environment, and occupies some space in the virtual environment. Exemplarily, in a case that the virtual environment is a 3D virtual environment, the virtual character is a 3D model created based on a skeletal animation technology.

Virtual article: an interactive article in a virtual environment, including but not limited to a virtual object, a virtual building, a virtual creature, a virtual transportation vehicle, and the like.

Figure 1:
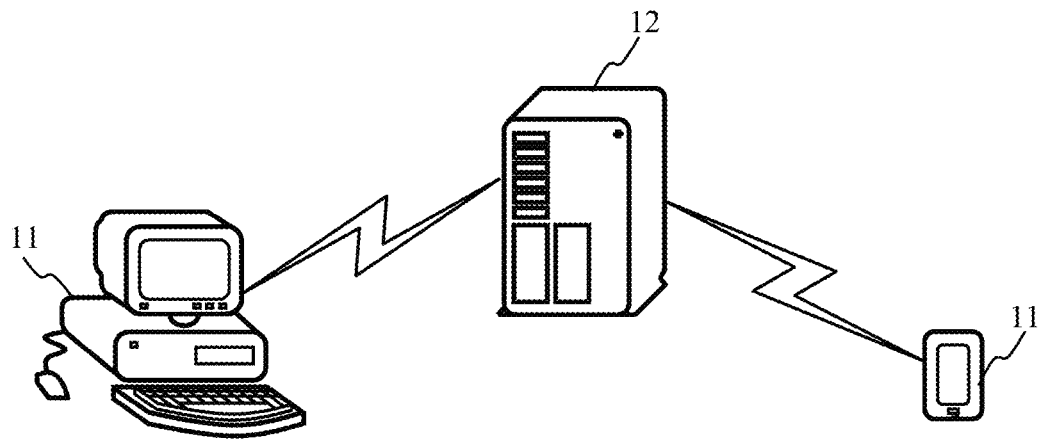
FIG. 1 is a schematic diagram of an example implementation environment of a method for determining a selected target according to an embodiment of this disclosure.

An embodiment of this disclosure provides a method for determining a selected target. FIG. 1 is a schematic diagram of an implementation environment of a method for determining a selected target according to an embodiment of this disclosure. The implementation environment includes a terminal 11 and a server 12.

An application program that can display a thumbnail map is installed and runs in the terminal 11. In an exemplary embodiment, the thumbnail map is a thumbnail map of a virtual environment, and the application program that can display a thumbnail map can further provide a virtual environment. In this case, an interactive object can use the terminal 11 to control a virtual object to perform an activity in the virtual environment provided by the application program. The activity includes, but is not limited to: at least one of adjusting a body posture, crawling, walking, running, riding, jumping, driving, picking up, shooting, attacking, and throwing.

The server 12 is configured to provide a background service for the application program that is installed in the terminal 11 and that can display a thumbnail map. In a possible implementation, the server 12 is responsible for primary computing work, and the terminal 11 is responsible for secondary computing work; the server 12 is in charge of secondary computing work, and the terminal 11 is in charge of primary computing; or a distributed computing architecture is adopted between the server 12 and the terminal 11 to perform collaborative computing.

In a possible implementation, the terminal 11 is any electronic product such as a personal computer (PC), a mobile phone, a smartphone, a personal digital assistant (PDA), a wearable device, a handheld portable game device, a pocket personal computer (PPC), a tablet computer, a smart car machine, a smart TV, or a smart speaker, that can perform human-computer interaction with a user through one or more of a keyboard, a touch panel, a touchscreen, a remote control, a voice interaction device, a handwriting device, and the like. The server 12 may be one server, a server cluster including a plurality of servers, or a cloud computing service center. The terminal 11 and the server 12 establish a communication connection through a wired or wireless network.

A person skilled in the art is to understand that the terminal 11 and server 12 are only examples, and other existing or potential terminals or servers that are applicable to this application are also to be included in the scope of protection of this application, and are included herein by reference.

Figure 2:
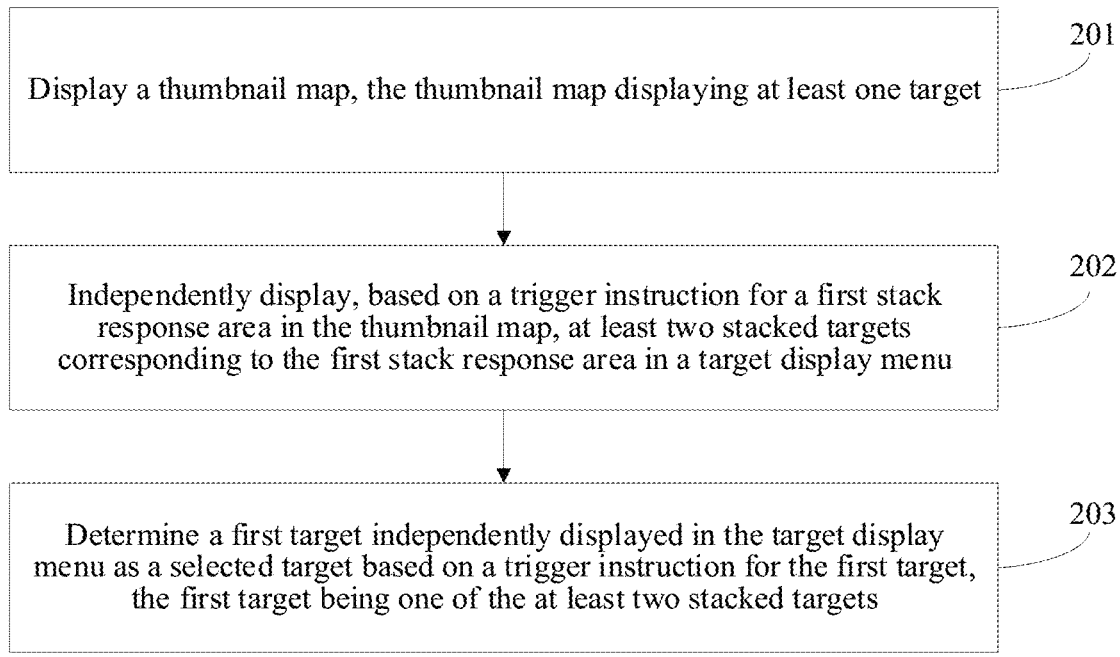
FIG. 2 is a flowchart of a method for determining a selected target according to an embodiment of this disclosure.

Based on the implementation environment shown in FIG. 1, an embodiment of this disclosure provides a method for determining a selected target. For example, the method is applied to the terminal 11. As shown in FIG. 2, the method provided in this embodiment of this disclosure includes the following steps 201 to 203.

Step 201: Display a thumbnail map, the thumbnail map displaying at least one target.

The thumbnail map is a map with a reduced size, and a type of the thumbnail map is not limited in this embodiment of this disclosure. Exemplarily, the thumbnail map may include a thumbnail map of a real environment. Alternatively, the thumbnail map may include a thumbnail map of a virtual environment. When the thumbnail map is a thumbnail map of a real environment, the thumbnail map is a reduced version of a map of the entire real environment. When the thumbnail map is a thumbnail map of a virtual environment, the thumbnail map is a reduced version of a map of the entire virtual environment. In this embodiment of this disclosure, for example, the thumbnail map is a thumbnail map of a virtual environment.

When the thumbnail map is a thumbnail map of a virtual environment, an application program that can display the thumbnail map can further provide a virtual environment. A type of an application program that can provide a virtual environment is not limited in this embodiment of this disclosure. Exemplarily, an application program that can provide a virtual environment may include a game application program, such as a third-person shooting (TPS) game, a first-person shooting (FPS) game, a multiplayer online battle arena (MOBA) game, or a multiplayer gun battle survival game.

In addition to game application programs, an application program that can provide a virtual environment can be another type of application program, for example, a virtual reality (VR) application program, an augmented reality (AR) application program, a 3-dimensional map program, a military simulation program, a social application program, or an interactive entertainment application program.

In an exemplary embodiment, the thumbnail map of a virtual environment can show spatial distribution, connection, temporal development/change states, and the like of virtual objects in the virtual environment. The thumbnail map of a virtual environment can be a two-dimensional map or a three-dimensional map. This quickly and visually shows a current situation of the virtual environment to an interactive object, to help the interactive object to formulate a usage policy, perform an operation, and the like.

The thumbnail map displays at least one target, and the at least one target can be selected by the interactive object. When the thumbnail map is a thumbnail map of a real environment, one target in the thumbnail map corresponds to one real article in the real environment. When the thumbnail map is a thumbnail map of a virtual environment, one target in the thumbnail map corresponds to one virtual article in the virtual environment. In this embodiment of this disclosure, for example, the thumbnail map is a thumbnail map of a virtual environment, that is, a target in the thumbnail map corresponds to a virtual article in the virtual environment.

When a target in the thumbnail map corresponds to a virtual article in the virtual environment, each target is displayed in the thumbnail map according to a location of a corresponding virtual article in the virtual environment, and a display location of a target in the thumbnail map can indicate a location of a virtual article corresponding to the target in the virtual environment. A type of a virtual article corresponding to a selectable target in the thumbnail map is not limited in this embodiment of this disclosure. Exemplarily, a type of a virtual article corresponding to a selectable target includes, but is not limited to, a virtual object, a virtual building, a virtual creature, a virtual transportation vehicle, and the like.

In an exemplary embodiment, for at least one target displayed in the thumbnail map, targets corresponding to different types of virtual articles also have different shapes or visual appearances. Exemplarily, a type of a target corresponding to a virtual object is an avatar of the virtual object, and a type of a target corresponding to a virtual building is an icon of the virtual building. In an exemplary embodiment, for targets that all correspond to virtual objects, different features are used to reflect different camps of the virtual objects corresponding to the targets. For example, the features may be colors, image identifiers, and text identifiers. This is not limited in this embodiment of this disclosure.

In a possible implementation, different targets correspond to different display levels, and each target is displayed in the thumbnail map according to a display level of the target. Exemplarily, the display levels corresponding to the targets are determined based on an order in which virtual articles corresponding to the targets are loaded in a process of generating the virtual environment. A display level of a target corresponding to a virtual article loaded first is lower, and a display level of a target corresponding to a virtual article loaded later is higher. When targets are displayed according to display levels of the targets, the targets are displayed from the bottom layer to the top layer in ascending order of the display levels. To be specific, targets are displayed at different layers in the thumbnail map, the target with the lowest display level (that is, the target corresponding to the virtual article loaded first) is displayed at the bottom layer, and the target with the highest display level (that is, the target corresponding to the virtual article loaded last) is displayed at the top layer. In the process of generating the virtual environment, loading orders of different virtual objects may be the same or different. If the loading orders of different virtual objects are different, display levels corresponding to the targets corresponding to the different virtual objects are also different.

In a possible implementation, occasions for displaying the thumbnail map include, but are not limited to, the following two occasions: a specified condition being satisfied and obtaining a display instruction for the thumbnail map.

The specified condition may be be pre-configured or flexibly adjusted according to an application scenario. This is not limited in this embodiment of this disclosure. Exemplarily, in a game application program, satisfying a specified condition refers to the start of a game. Alternatively, satisfying a specified condition means that a virtual object enters a specified game scenario, or the like. The specified game scenario is specified according to experience or flexibly adjusted according to a type and a version of the game application program. This is not limited in this embodiment of this disclosure.

The display instruction for the thumbnail map is an instruction sent by an interactive object to instruct to display the thumbnail map. A method for obtaining the display instruction for the thumbnail map is not limited in this embodiment of this disclosure. Exemplarily, the display interface of the application program displays a thumbnail map display entry, and the display instruction for the thumbnail map is obtained based on a trigger operation performed on the thumbnail map display entry by the interactive object. A form of the thumbnail map display entry is set by a developer, for example, the form of the thumbnail map display entry is a button. Alternatively, the form of the thumbnail map display entry is a triggerable icon.

In a possible implementation, a manner of displaying the thumbnail map is: displaying the thumbnail map in a specified location of the display interface. The specified location is set by a developer, and different application programs may have different specified locations. Exemplarily, the specified location is at the upper left corner of the display interface. Alternatively, the specified location is at the upper right corner of the display interface, or the like.

The display interface is an interface displayed on the screen of the terminal for viewing by an interactive object such as a game player. In a possible implementation, in addition to the thumbnail map, the display interface also displays a scene image. When the thumbnail map is a thumbnail map of a virtual environment, the displayed image may include image of the virtual environment, and the displayed image of the virtual environment is used to visually show the virtual environment. Exemplarily, the displayed image of the virtual environment may show a part of the virtual environment. For example, the displayed image of the virtual environment displayed in the display interface of the terminal shows a part of a virtual environment near a location of a virtual object controlled by an account currently logged into on the terminal. When the thumbnail map is a thumbnail map of a real environment, the displayed image is a displayed image of the real environment, and the displayed image of the real environment is used to visually show the real environment.

Figure 3:
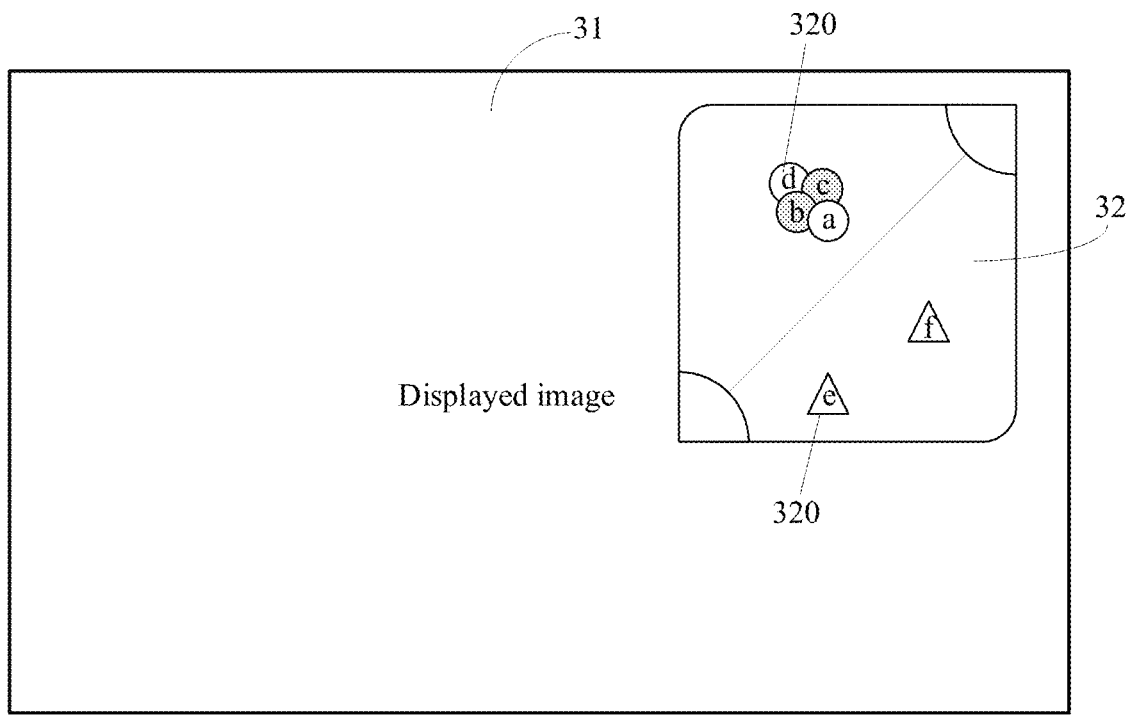
FIG. 3 is a schematic diagram of a display interface according to an embodiment of this disclosure.

In an exemplary embodiment, the displayed image displayed in the display interface occupies the entire display interface. In this case, the thumbnail map is displayed in a specified location of the display interface in a manner of blocking a part of the displayed image. Exemplarily, referring to FIG. 3, the display interface displays a displayed image 31 and a thumbnail map 32, and the thumbnail map 32 displays multiple selectable targets 320 (only a target d and a target e are marked).

Exemplarily, in the thumbnail map 32, types of the target e and a target f are virtual building icons, and types of a target a, a target b, a target c, and the target d are virtual object avatars. For the targets whose types are virtual object avatars, different colors are used to indicate different camps of virtual objects corresponding to the targets. For example, the white color is used to indicate that a camp of a virtual object corresponding to a target is the same as that of a virtual object controlled by an account logged into on the terminal, that is, white targets (the target a and the target d) are targets corresponding to virtual objects of the account. Light grey is used to indicate that a camp of a virtual object corresponding to a target is different from that of the virtual object controlled by the account logged into on the terminal, that is, light grey targets (the target b and the target c) are targets corresponding to virtual objects of the opposing side.

Display levels corresponding to the target a, the target b, the target c, and the target d in the thumbnail map 32 have the following relationship: the display level corresponding to the target a>the display level corresponding to the target b>the display level corresponding to the target c>the display level corresponding to the target d. Therefore, the target d is displayed at the bottom layer, the target c is displayed above the target d, the target b is displayed above the target c, and the target a is displayed above the target b.

The above description only uses the example in which the thumbnail map is a thumbnail map of a virtual environment. This embodiment of this disclosure is not limited thereto. The thumbnail map can also be a thumbnail map of a real environment. When the thumbnail map is a thumbnail map of a real environment, each target displayed in the thumbnail map corresponds to a real article in the real environment. In this embodiment of this disclosure, a type of a real article in the real environment is not limited. Exemplarily, the type of the real article includes, but is not limited to, a real building, a real transportation vehicle, a real creature (for example, a person and an animal), and the like. Types of targets corresponding to real articles include, but are not limited to, a real building icon, a real transportation vehicle icon, a real creature icon, and the like.

Step 202: Independently present, based on a trigger instruction for (i.e., targeting, or applying to) a first stack response area in the thumbnail map, at least two stacked targets corresponding to the first stack response area in a target presentation menu. The at least two stacked targets are presented in the target presentation menu without overlap/stack to each other.

The first stack response area is a combined area of trigger response areas respectively corresponding to the at least two stacked targets in the thumbnail map.

The thumbnail map includes at least one stack response area, each stack response area corresponds to a stacked target group, and each stacked target group includes at least two stacked targets. That is, each stack response area corresponds to at least two stacked targets, and each stack response area is a combined area of trigger response areas respectively corresponding to the at least two stacked targets corresponding to the stack response area in the thumbnail map. After the trigger instruction for the first stack response area in the thumbnail map is obtained, at least two stacked targets corresponding to the first stack response area can be determined, and then the at least two stacked targets corresponding to the first stack response area are independently presented in the target presentation menu, so that an interactive object can accurately select a target.

In a possible implementation, before step 202 is performed, the trigger instruction for the first stack response area in the thumbnail map needs to be obtained. In a possible implementation, a manner of obtaining the trigger instruction for the first stack response area in the thumbnail map is: obtaining the trigger instruction for the first stack response area in the thumbnail map in response to detection of a trigger operation performed on the first stack response area of at least one stack response area respectively corresponding to the at least one stacked target group. The first stack response area is one of at least one stack response area respectively corresponding to at least one stacked target group. A type of the trigger operation performed on the first stack response area in this embodiment of this disclosure is not limited, and can be set by a developer. Exemplarily, the trigger operation performed on the first stack response area is a pressing operation. Alternatively, the trigger operation performed on the first stack response area is a click operation or the like.

Before the trigger instruction for the first stack response area in the thumbnail map is obtained, at least one stacked target group and at least one stack response area respectively corresponding to the at least one stacked target group need to be determined. In a possible implementation, a manner of determining the at least one stacked target group is: performing stack detection on the at least one target to obtain at least one stacked target group, where one stacked target group includes at least two stacked targets.

The stacked target group includes at least two stacked targets. Referring back to FIG. 3, target a, b, c, and d form a stacked target group. In an exemplary embodiment, a process of performing stack detection on at least one target to obtain at least one stacked target group includes the following steps 1 to 3:

Step 1: Select any one of the at least one target as an initial target, and in response to that at least one target other than the initial target includes a target satisfying a condition of stacking with the initial target, use the target satisfying the condition of stacking with the initial target as a first-level stacked target corresponding to the initial target.

The first-level stacked target corresponding to the initial target is a target included in at least one target other than the initial target and satisfying the condition of stacking with the initial target. The initial target may correspond to one or more first-level stacked targets. This is not limited in this embodiment of this disclosure. In an exemplary embodiment, an implementation of monitoring to obtain a target included in at least one target other than the initial target and satisfying the condition of stacking with the initial target is: in response to that a distance between a second target and the initial target is less than a reference value, determining the second target as the target satisfying the condition of stacking with the initial target, where the reference value is a sum of a display radius of the second target in the thumbnail map and a display radius of the initial target in the thumbnail map. The second target is any one of at least one target other than the initial target.

When the distance between the second target and the initial target is less than the sum of the display radius of the second target in the thumbnail map and the display radius of the initial target in the thumbnail map, it means that the second target and the initial target are stacked in the thumbnail map, and it is considered that the second target is a target satisfying the condition of stacking with the initial target. Exemplarily, the distance between the second target and the initial target is a distance between a display location of the second target in the thumbnail map and a display location of the initial target in the thumbnail map.

In an exemplary embodiment, a manner of determining a display radius of a target in the thumbnail map is related to a shape of the target. For example, when the target is a circle, the radius of the circle is used as the display radius of the target in the thumbnail map. When the target is a non-circular shape, an approximate radius of the non-circular shape is used as the display radius of the target in the thumbnail map. A manner of determining an approximate radius of a non-circular shape is not limited in this embodiment of this disclosure. Exemplarily, a manner of determining an approximate radius of a non-circular shape is: determining a center-of-mass of the non-circular shape, and using the average of distances between boundary points of the non-circular shape to the center-of-mass as the approximate radius of the non-circular shape.

For example, the distance between the second target and the initial target is marked as L, the display radius of the second target in the thumbnail map is marked as R1, and the display radius of the initial target in the thumbnail map is marked as R2. When L<R1+R2, it indicates that the second target is a target satisfying the condition of stacking with the initial target.

In a possible implementation, it is possible that for an initial target, there may not be another target satisfying a stacking condition with the initial target. In this case, it means that the stacked target group cannot be obtained based on the initial target. An initial target needs to re-selected from at least one target other than the foregoing initial target and step 1 is repeated, until a first-level stacked target corresponding to a re-selected initial target can be obtained.

Step 2: In response to that at least one target other than the initial target and each level of stacked target corresponding to the initial target includes a target satisfying a condition of stacking with a previous-level stacked target corresponding to the initial target, use the target satisfying the condition of stacking with the previous-level stacked target corresponding to the initial target as a next-level stacked target corresponding to the initial target, until the at least one target other than the initial target and each level of stacked target corresponding to the initial target does not include a target satisfying the condition of stacking with the previous-level stacked target corresponding to the initial target, and obtain a stacked target group based on the initial target and each level of stacked target corresponding to the initial target.

Each level of stacked target corresponding to the initial target is each level of stacked target that has been obtained currently and that corresponds to the initial target. The previous-level stacked target corresponding to the initial target is a level of stacked target that is mostly recently obtained and that is of levels of stacked targets that have been obtained currently. The next-level stacked target corresponding to the initial target is a level of stacked target that needs to be obtained next time. As the stack detection process of the initial target proceeds, each level of stacked target, the previous-level stacked target, and the next-level stacked target corresponding to the initial target constantly change.

When only the first-level stacked target corresponding to the initial target is obtained, each level of stacked target corresponding to the initial target includes only the first-level stacked target. The previous-level stacked target corresponding to the initial target is the first-level stacked target. The next-level stacked target corresponding to the initial target is a second-level stacked target corresponding to the initial target. A process of obtaining the second-level stacked target corresponding to the initial target is: in response to that at least one target other than the initial target and the first-level stacked target corresponding to the initial target includes a target satisfying a condition of stacking with the first-level stacked target corresponding to the initial target, using the target satisfying the condition of stacking with the first-level stacked target corresponding to the initial target as the second-level stacked target corresponding to the initial target. The second-level stacked target corresponding to the initial target is a target that is of at least one target other than the initial target and the first-level stacked target and that satisfies a condition of stacking with the first-level stacked target corresponding to the initial target. For a process of monitoring to obtain a target satisfying the condition of stacking with the first-level stacked target, refer to the process of monitoring to obtain a target satisfying a condition of stacking with the initial target in step 1.

When there are multiple first-level stacked targets, second-level stacked targets corresponding to the initial target are a union set of targets satisfying the condition of stacking with the first-level stacked targets. When at least one target other than the initial target and the first-level stacked target at least includes a target satisfying a condition of stacking with a first-level stacked target, the second-level stacked target corresponding to the initial target can be obtained.

In a possible implementation, in a process of monitoring to obtain a target satisfying the condition of stacking with the first-level stacked target, a target satisfying the condition of stacking with the first-level stacked target may not be detected, that is, at least one target other than the initial target and the first-level stacked target does not include a target satisfying a condition of stacking with the first-level stacked target. In this case, the initial target and the first-level stacked target corresponding to the initial target directly form a stacked target group.

If a target satisfying the condition of stacking with the first-level stacked target is detected, the target satisfying the condition of stacking with the first-level stacked target is used as the second-level stacked target corresponding to the initial target. At least one target other than the initial target, the first-level stacked target corresponding to the initial target, and the second-level stacked target corresponding to the initial target continues to be monitored to obtain a target satisfying the condition of stacking with the second-level stacked target, and so on, until the at least one target other than the initial target and each level of stacked target corresponding to the initial target does not include a target satisfying the condition of stacking with the previous-level stacked target corresponding to the initial target. In an exemplary embodiment, the previous-level stacked target corresponding to the initial target may also be referred to as the highest-level stacked target corresponding to the initial target.

When the at least one target other than the initial target and each level of stacked target corresponding to the initial target does not include a target satisfying the condition of stacking with the previous-level stacked target corresponding to the initial target, the initial target and each level of stacked target corresponding to the initial target form a stacked target group, to obtain a stacked target group.

Each level of stacked target corresponding to the initial target at least includes the first-level stacked target corresponding to the initial target. When each level of stacked target corresponding to the initial target only includes the first-level stacked target corresponding to the initial target, the highest-level stacked target corresponding to the initial target is the first-level stacked target. In this case, the initial target and the first-level stacked target corresponding to the initial target directly form a stacked target group.

Step 3: Select any one of at least one target other than targets included in the obtained stacked target group as an updated initial target, and continue to obtain a stacked target group until a stack detection termination condition is satisfied, to obtain the at least one stacked target group.

Each time after a stacked target group is obtained, any one of at least one target other than the targets in the obtained stacked target group is selected as an updated initial target, and then a stacked target group continues to be obtained based on the updated initial target. For a process of continuing to obtain a stacked target group, refer to step 1 and step 2. Details are not repeated herein.

When the stack detection termination condition is satisfied, all stacked target groups are obtained. In an exemplary embodiment, satisfying the stack detection termination condition means that no new stacked target group can be obtained. That no new stacked target group can be obtained means: when any one of at least one target other than the targets included in the obtained stacked target group is used as an initial target, no first-level stacked target corresponding to the initial target can be obtained. In an exemplary embodiment, satisfying the stack detection termination condition may also mean that a quantity of at least one target other than the targets in the obtained stacked target group is less than a quantity threshold. The quantity threshold is set according to experience.

After at least one stacked target group is obtained based on step 1 to step 3, each stacked target group includes an initial target and each level of stacked target corresponding to the initial target. In a stacked target group, any $N^{th}$-level (N is an integer not less than 1) stacked target corresponding to the initial target at least satisfies a condition of stacking with an $(N-1)^{th}$-level stacked target corresponding to the initial target. When N=1, the $(N-1)^{th}$-level stacked target corresponding to the initial target is the initial target itself.

The foregoing only illustrates a manner of performing stack detection on at least one target to obtain at least one stacked target group. This embodiment of this disclosure is not limited thereto.

After at least one stacked target group is obtained, a stack response area corresponding to each stacked target group is obtained. In a possible implementation, a manner of obtaining a stack response area corresponding to a stacked target group is: combining trigger response areas respectively corresponding to at least two stacked targets in the stacked target group in the thumbnail map, to obtain a stack response area corresponding to the stacked target group.

Each stacked target in a stacked target group corresponds to a trigger response area in the thumbnail map, and trigger response areas corresponding to different stacked targets in the thumbnail map may have an intersection area. Trigger response areas respectively corresponding to stacked targets in a stacked target group in the thumbnail map are combined, to obtain a stack response area corresponding to the stacked target group. A trigger response area corresponding to a target in the thumbnail map may be preset by a developer. This is not limited in this embodiment of this disclosure. For example, the trigger response area corresponding to the target in the thumbnail map is a rectangular area that uses the center-of-mass of the target as the center and that is not smaller than a display size of the target.

Figure 4:
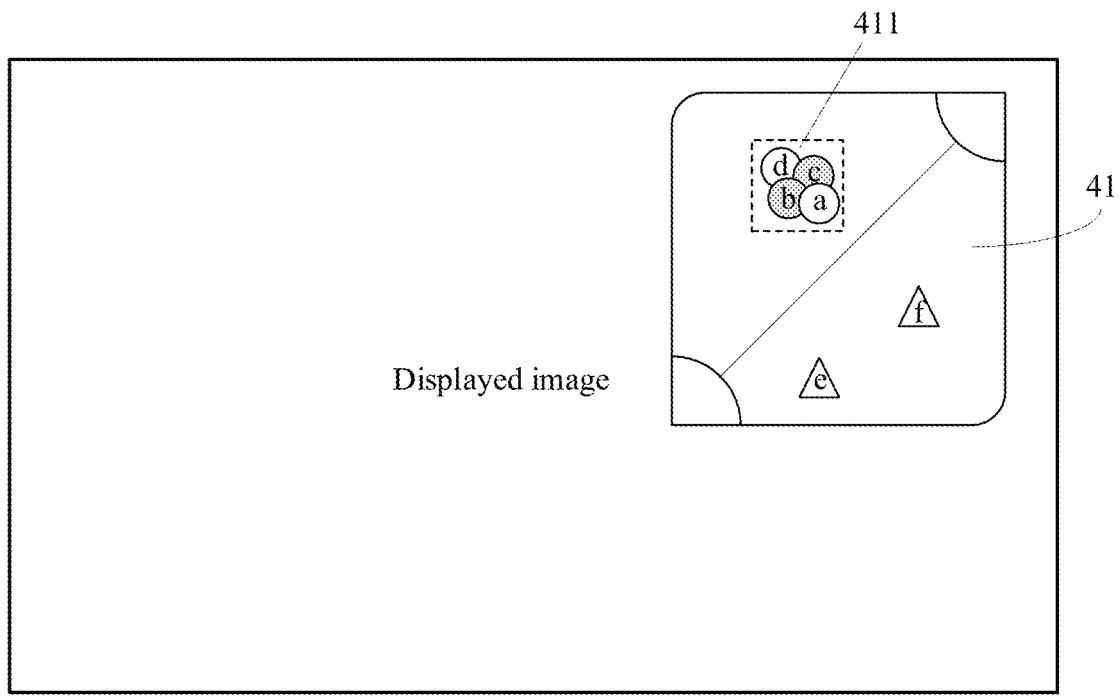
FIG. 4 is a schematic diagram of another display interface according to an embodiment of this disclosure.

Exemplarily, as shown in FIG. 4, the target a, the target b, the target c, and the target d in FIG. 4 form a stacked target group. Trigger response areas corresponding to the target a, the target b, the target c, and the target d in the thumbnail map 41 are combined, to obtain a stack response area 411 corresponding to the stacked target group formed by the target a, the target b, the target c, and the target d.

In the foregoing process, at least one stack response area respectively corresponding to at least one stacked target group may be determined. When it is detected that an interactive object performs a trigger operation on the first stack response area of at least one stack response area respectively corresponding to the at least one stacked target group, it indicates that the interactive object wants to select a stacked target in a stacked target group corresponding to the first stack response area. Because targets in the stacked target group corresponding to the first stack response area are stacked on each other, it is difficult for the interactive object to accurately select a target from the stacked targets directly in the thumbnail map. Based on this, in this embodiment of this disclosure, after the trigger instruction for the first stack response area in the thumbnail map is obtained, the at least two stacked targets corresponding to the first stack response area are independently presented in the target presentation menu, without overlap to each other. The at least two stacked targets corresponding to the first stack response area are independently presented in the target presentation menu, so that it is convenient for the interactive object to accurately select an independently presented target in the target presentation menu.

The target presentation menu is a menu for independently presenting each stacked target corresponding to a stack response area. Both a display form and a display location of the target presentation menu on the display interface are not limited in this embodiment of this disclosure. Exemplarily, the display form of the target presentation menu on the display interface is a form of floating layer, and the display location of the target presentation menu on the display interface is an upper location of the thumbnail map. The target presentation menu can also be displayed in other display forms and other locations on the display interface. These are not described one by one herein in this embodiment of this disclosure.

In addition, an implementation of independently presenting the at least two stacked targets corresponding to the first stack response area in the target presentation menu is not limited in this embodiment of this disclosure, as long as it can be ensured that the at least two stacked targets corresponding to the first stack response area are independently presented. In a possible implementation, an implementation of independently presenting the at least two stacked targets corresponding to the first stack response area in the target presentation menu is: determining display levels respectively corresponding to the at least two stacked targets corresponding to the first stack response area; and independently presenting the at least two stacked objects in the target presentation menu based on the display levels respectively corresponding to the at least two stacked objects.

Each target is displayed in the thumbnail map according to a display level of the target, and the display levels respectively corresponding to the at least two stacked targets can be determined according to display statuses of the at least two stacked targets in the thumbnail map. In a possible implementation, a manner of independently presenting the at least two stacked objects in the target presentation menu based on the display levels respectively corresponding to the at least two stacked objects is: independently presenting the at least two stacked objects in the target presentation menu in descending order or ascending order of the display levels respectively corresponding to the at least two stacked objects. This helps to improve the visual display effect of the at least two stacked targets in the target presentation menu and improve the usage experience of the interactive object.

In an exemplary embodiment, a manner of independently presenting the at least two stacked objects in the target presentation menu in descending order or ascending order of the display levels respectively corresponding to the at least two stacked objects is related to a form of the target presentation menu. For example, if the form of the target presentation menu is a horizontal list, the at least two stacked objects are independently presented in a horizontal form in the target presentation menu in descending order or ascending order of the display levels respectively corresponding to the at least two stacked objects. If the form of the target presentation menu is a vertical list, the at least two stacked objects are independently presented in a vertical form in the target presentation menu in descending order or ascending order of the display levels respectively corresponding to the at least two stacked objects. As the stacked objects are presented without overlap, the precision for selecting a stacked object is improved.

In an exemplary embodiment, if two or more of at least two stacked objects correspond to the same display level, the two or more targets are independently presented in a random order in the target presentation menu.

In an exemplary embodiment, a display size of a target in the thumbnail map may be the same as or different from that of the target in the target presentation menu. This is not limited in this embodiment of this disclosure. Exemplarily, a display size of a target in the target presentation menu is larger than that of the target in the thumbnail map, to improve the display effect of the target in the target presentation menu.

Figure 5:
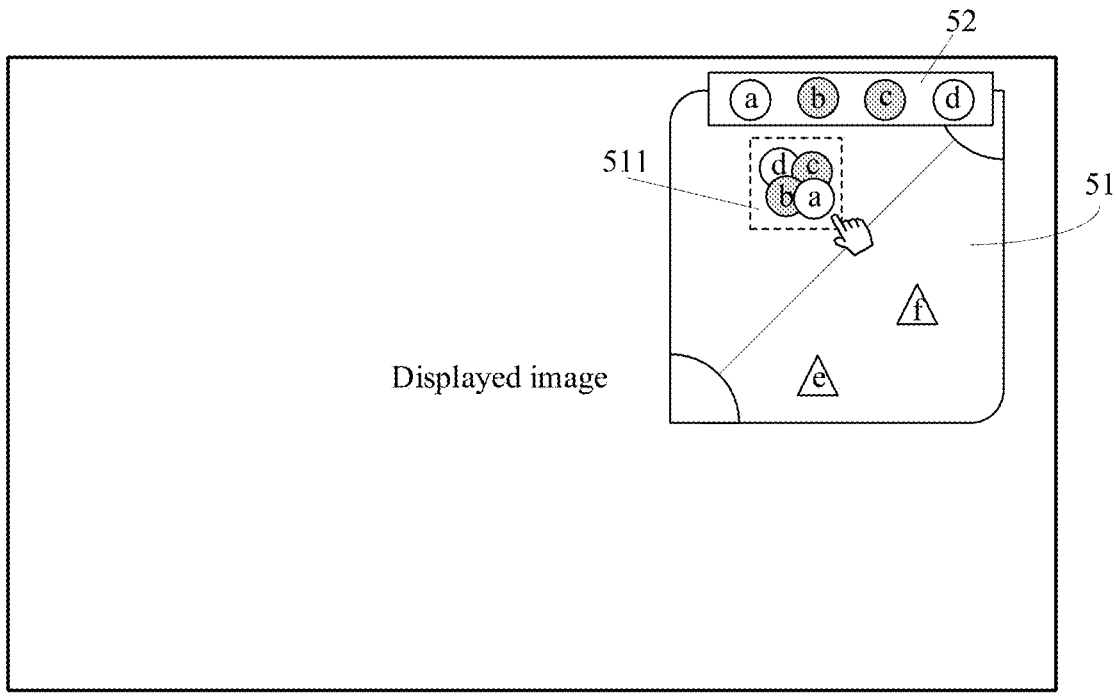
FIG. 5 is a schematic diagram of another display interface according to an embodiment of this disclosure.

Exemplarily, as shown in FIG. 5, at least two stacked targets (a target a, a target b, a target c, and a target d) corresponding to a first stack response area 511 are independently presented in a target presentation menu 52 based on a trigger instruction for the first stack response area 511 in a thumbnail map 51. The target presentation menu 52 is in an upper location of the thumbnail map 51.

Step 203: Determine a first target independently presented in the target presentation menu as a selected target based on a trigger instruction for the first target, the first target being one of the at least two stacked targets.

After the at least two stacked targets corresponding to the first stack response area are independently presented in the target presentation menu, an interactive object can select each target independently presented in the target presentation menu. When the trigger instruction for the first target independently presented in the target presentation menu is obtained, the first target is determined as the selected target based on the trigger instruction for the first target independently presented in the target presentation menu. The first target is one of the targets independently presented in the target presentation menu, that is, one of the at least two stacked targets corresponding to the first stack response area. The selected target determined at this time is a target that the interactive object really wants to select.

In a possible implementation, before step 203 is performed, the trigger instruction for the first target independently presented in the target presentation menu needs to be obtained. In a possible implementation, a manner of obtaining the trigger instruction for the first target independently presented in the target presentation menu is: in response to detection of a trigger operation performed on the first target independently presented in the target presentation menu, obtaining the trigger instruction for the first target independently presented in the target presentation menu. A type of the trigger operation performed on the first target independently presented in the target presentation menu is flexibly set by a developer. This is not limited in this embodiment of this disclosure. Exemplarily, the trigger operation performed on the first target independently presented in the target presentation menu is a click operation performed on a trigger response area corresponding to the first target in the target presentation menu.

Exemplarily, the trigger operation performed on the first target independently presented in the target presentation menu is a sliding operation from an initial trigger point to a reference trigger point corresponding to the first target independently presented in the target presentation menu. The initial trigger point is a trigger point corresponding to the trigger operation performed on the first stack response area, and the reference trigger point is any trigger point in a trigger response area corresponding to the first target in the target presentation menu. That is, in response to detection of the sliding operation from the initial trigger point to the reference trigger point corresponding to the first target independently presented in the target presentation menu, the trigger instruction for the first target independently presented in the target presentation menu is obtained.

Figure 6:
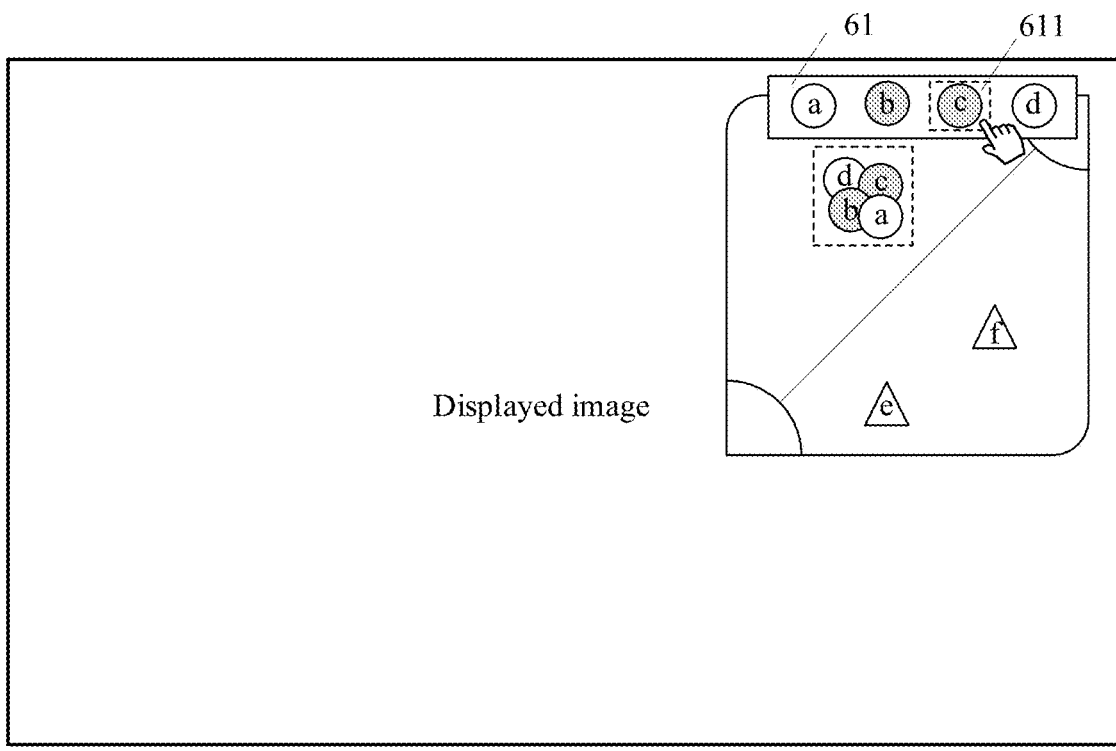
FIG. 6 is a schematic diagram of another display interface according to an embodiment of this disclosure.

Exemplarily, as shown in FIG. 6, when it is detected that a click operation is performed on a trigger response area 611 that corresponds to a target c independently presented in a target presentation menu 61 and that is in the target presentation menu 61, a trigger instruction for the target c independently presented in the target presentation menu 61 is obtained.

Figure 7:
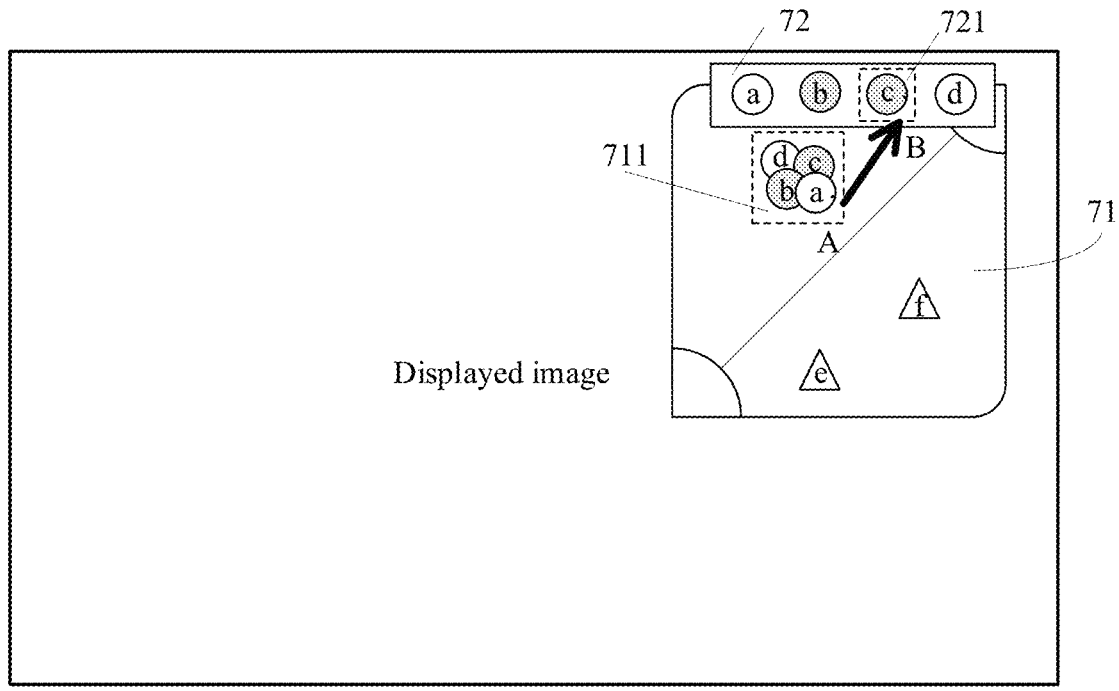
FIG. 7 is a schematic diagram of another display interface according to an embodiment of this disclosure.

Exemplarily, as shown in FIG. 7, a stack response area 711 is any stack response area in a thumbnail map 71. When a sliding operation from an initial trigger point A corresponding to a trigger operation performed on the stack response area 711 to a reference trigger point B corresponding to a target c independently presented in a target presentation menu 72 is detected, a trigger instruction for the target c independently presented in the target presentation menu 72 is obtained. The reference trigger point B is any trigger point in a trigger response area 721 corresponding to the independently presented target c in the target presentation menu 72.

In a possible implementation, after determining the first target as the selected target, the method further includes: adjusting a presentation state of the selected target in the target presentation menu to a first selected state; and adjusting a display state of the selected target in the thumbnail map to a second selected state. The first selected state is used to highlight the selected target in the target presentation menu, and the second selected state is used to highlight the selected target in the thumbnail map. State adjustment can visually prompt the interactive object which target is the selected target.

The first selected state and the second selected state are set according to experience or flexibly adjusted according to an application scenario. This is not limited in this embodiment of this disclosure. The first selected state and the second selected state may be the same or different. Exemplarily, both the first selected state and the second selected state are states having a specified color. In this case, adjusting the presentation state of the selected target in the target presentation menu to the first selected state is: adjusting a presentation color of the selected target in the target presentation menu to the specified color; and adjusting the display state of the selected target in the thumbnail map to the second selected state is: adjusting a display color of the selected target in the thumbnail map to the specified color. The specified color is not limited in this embodiment of this disclosure, as long as the selected target can be visually distinguished from another target.

Figure 8:
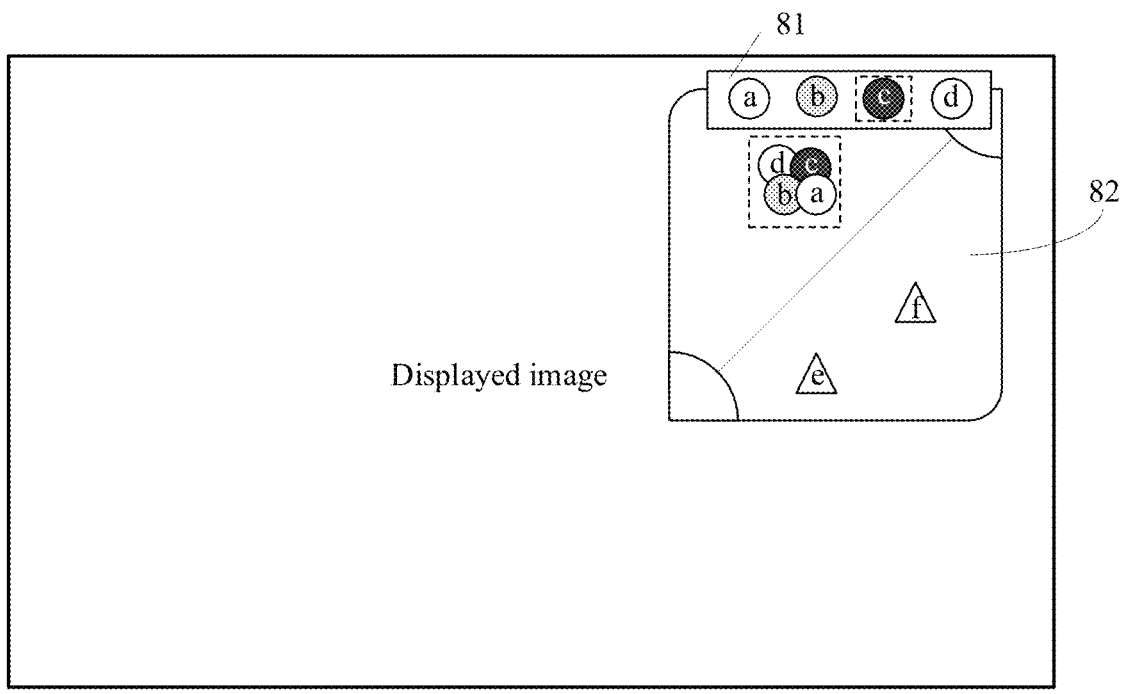
FIG. 8 is a schematic diagram of another display interface according to an embodiment of this disclosure.

For example, as shown in FIG. 8, the specified color is dark grey. When it is determined that a target c is the selected target, a presentation color of the target c in a target presentation menu 81 is adjusted to dark grey, and a display color of the target c in a thumbnail map 82 is adjusted to dark grey.

The foregoing only illustrates adjustment of the state of the selected target after the first target is determined as the selected target. This embodiment of this disclosure is not limited thereto. Exemplarily, after the first target is determined as the selected target, the presentation state of the selected target in the target presentation menu can alternatively keep unchanged; and the display state of the selected target in the thumbnail map is adjusted to a selected state.

Figure 9:
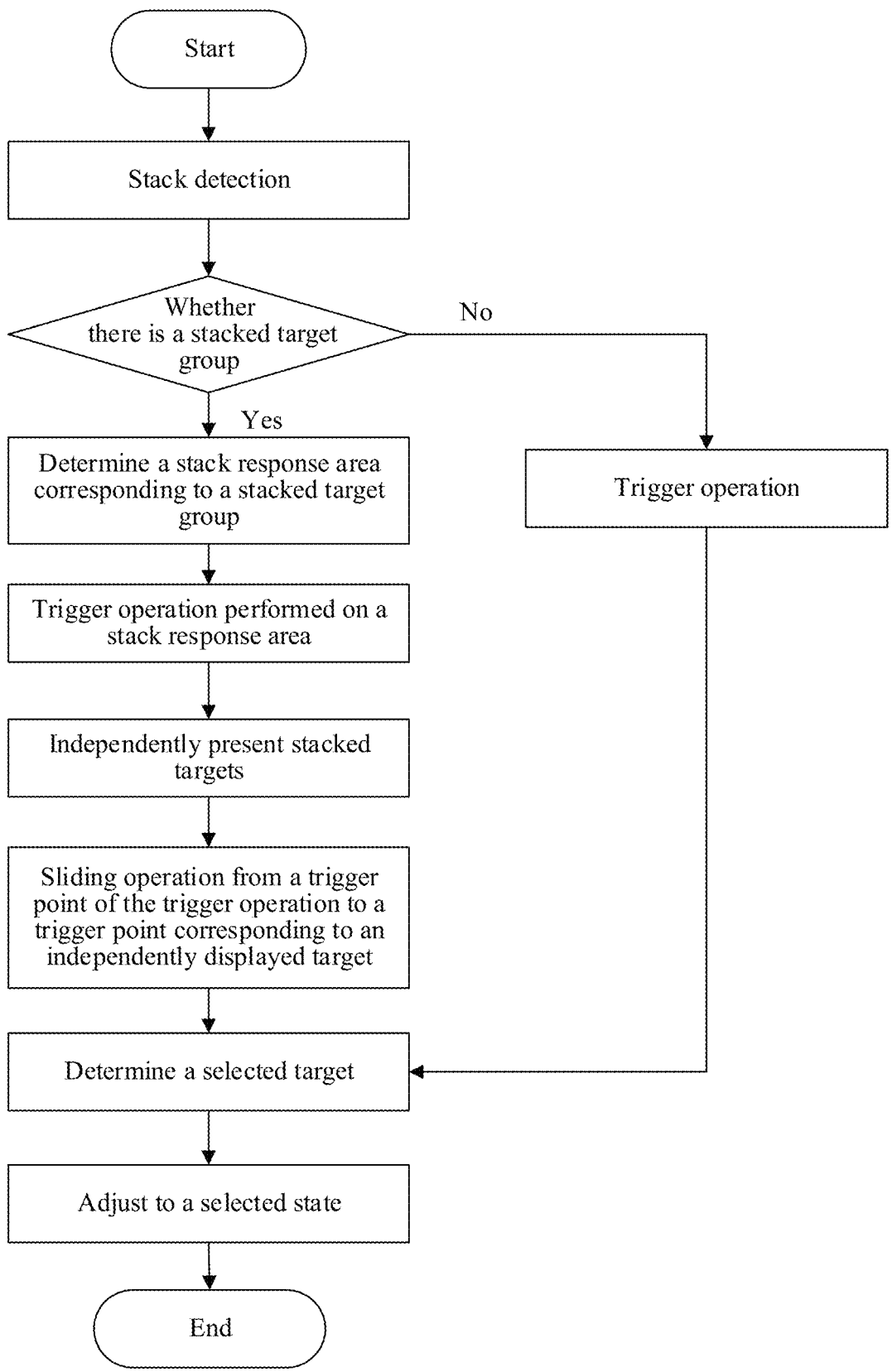
FIG. 9 is a schematic diagram of a process for determining a selected target according to an embodiment of this disclosure.

Exemplarily, a process of determining the selected target is shown in FIG. 9. Stack detection is first performed on at least one target displayed in the thumbnail map, to determine whether there is a stacked target group. When there is no stacked target group, if it is detected that a trigger operation is performed on a trigger response area that is of a target in the thumbnail map and that is in the thumbnail map, the selected target is directly determined, and the display state of the selected target in the thumbnail map is adjusted to a selected state.

When there is a stacked target group, trigger response areas of stacked targets in the thumbnail map are combined, to determine a stack response area corresponding to each stacked target group. When a trigger operation performed on a stack response area is detected, at least two stacked targets corresponding to the stack response area are independently presented in the target presentation menu. When a sliding operation from a trigger point of the trigger operation to a trigger point corresponding to an independently presented target is detected, the selected target is determined, and the display state of the selected target in the thumbnail map is adjusted to the selected state.

In a possible implementation, after the first target is determined as the selected target, the method further includes: hiding the target presentation menu based on a hiding instruction for the target presentation menu. In a possible implementation, the hiding instruction for the target presentation menu is obtained based on a hiding operation performed on the target presentation menu, and the hiding operation performed on the target presentation menu is not limited in this embodiment of this disclosure. Exemplarily, a hiding button is displayed near the target presentation menu, and a trigger operation performed on the hiding button is considered as a hiding operation performed on the target presentation menu.

Exemplarily, when the trigger operation performed on the first target independently presented in the target presentation menu is a sliding operation from the initial trigger point corresponding to the trigger operation in the first stack response area to the reference trigger point corresponding to the independently presented first target, the hiding operation performed on the target presentation menu is a sliding end operation. For example, a finger is always in contact with the screen during the sliding operation, and the sliding end operation is an operation that the finger leaves the screen, that is, an operation that the finger is released.

Figure 10:
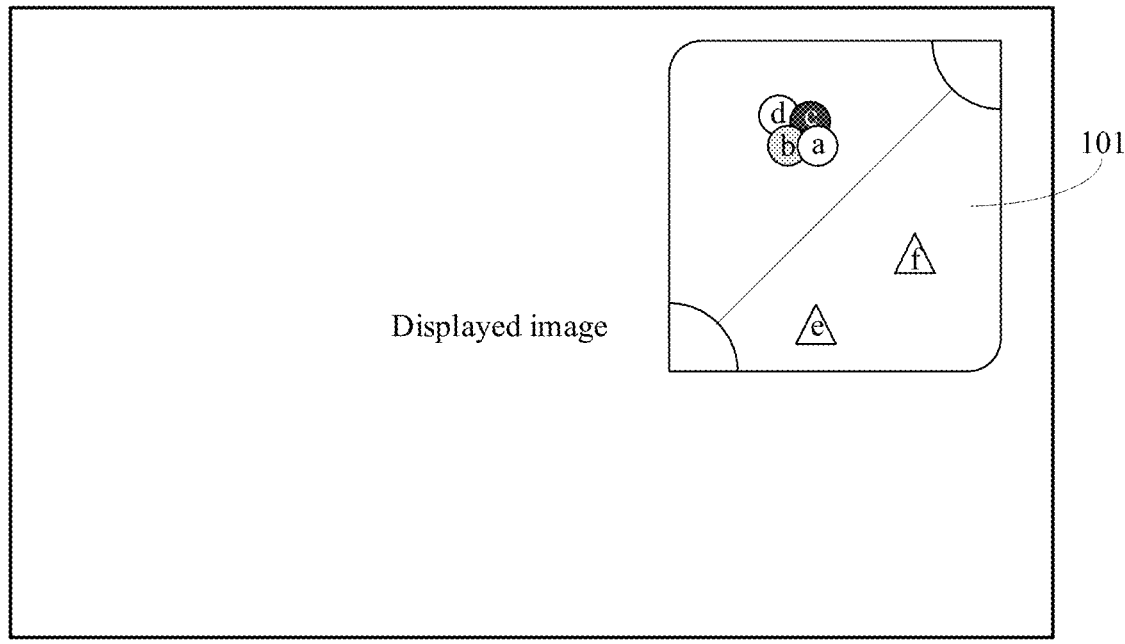
FIG. 10 is a schematic diagram of another display interface according to an embodiment of this disclosure.

In an exemplary embodiment, when the display state of the selected target in the thumbnail map is already adjusted to the second selected state before the target presentation menu is hidden, after the target presentation menu is hidden, the display state of the selected target in the thumbnail map is still the second selected state. For example, as shown in FIG. 10, the second selected state is a state of a specified color, and the specified color is dark grey. After the target presentation menu is hidden, a display color of a selected target c in a thumbnail map 101 is still dark grey.

In a possible implementation, after the first target is determined as the selected target, the method further includes: displaying at least one candidate operation corresponding to the selected target; and performing a reference operation of the at least one candidate operation based on a selection instruction for the reference operation. The at least one candidate operation corresponding to the selected target is an executable operation corresponding to the selected target. At least one candidate operation corresponding to different targets may be the same or different. This is not limited in this embodiment of this disclosure.

The at least one candidate operation corresponding to the selected target is set according to experience or flexibly adjusted according to an actual case. This is not limited in this embodiment of this disclosure. In an exemplary embodiment, the at least one candidate operation corresponding to the selected target is related to a type of the selected target.

Exemplarily, when the type of the selected target is a virtual object avatar, the at least one candidate operation corresponding to the selected target includes, but is not limited to: attacking a virtual object corresponding to the selected target, sending a message to the virtual object corresponding to the selected target, and switching a displayed image to a displayed image that displays a virtual environment near the virtual object corresponding to the selected target. In an exemplary embodiment, when the type of the selected target is a virtual object avatar, the at least one candidate operation corresponding to the selected target when the selected target is a target corresponding to a virtual object of the account is different from that corresponding to the selected target when the selected target is a target corresponding to a virtual object of an opposing side.

Exemplarily, when the type of the selected target is a virtual building icon, the at least one candidate operation corresponding to the selected target includes, but is not limited to: destroying a virtual building corresponding to the selected target, moving the virtual object controlled by the account logged into on the terminal to a virtual building corresponding to the selected target for hiding, and the like.

Exemplarily, when the type of the selected target is a real creature icon, the at least one candidate operation corresponding to the selected target includes, but is not limited to: switching the displayed image to a displayed image that displays a real environment near a real creature corresponding to the selected target, displaying related information of a real creature corresponding to the selected target in a pop-up window, and the like. Exemplarily, when the type of the selected target is a real building, the at least one candidate operation corresponding to the selected target includes, but is not limited to: switching the displayed image to a displayed image that displays a real environment near the real building corresponding to the selected target, displaying related information of the real building corresponding to the selected target in a pop-up window, and the like.

When a selection instruction for a reference operation of the at least one candidate operation is obtained, the reference operation is performed based on the selection/triggering instruction for the reference operation. For example, when the type of the selected target is a virtual object avatar and a trigger instruction for a reference operation of attacking a virtual object corresponding to the selected target is obtained, the virtual object corresponding to the selected target is attacked.

The foregoing only illustrates an exemplary implementation of performing the reference operation after the first target is determined as the selected target. This embodiment of this disclosure is not limited thereto. Exemplarily, the reference operation may also be a default operation corresponding to the selected target. In this case, the default operation is directly performed.

In this embodiment of this disclosure, at least two stacked targets corresponding to the stack response area are independently presented in the target presentation menu. This can solve the problem that a blocked target cannot be accurately selected when targets in the thumbnail map are stacked, and the determined selected target is a target that the interactive object really wants to select.

In the embodiments of this application, based on the trigger instruction for the stack response area, the target presentation menu independently presents stacked targets corresponding to the stack response area, and then a triggered target of the independently presented targets is determined as a selected target. In this process, a target independently presented in the target presentation menu can be accurately selected, and it is very accurate to determine a triggered target of the independently presented targets as a selected target.

Figure 11:
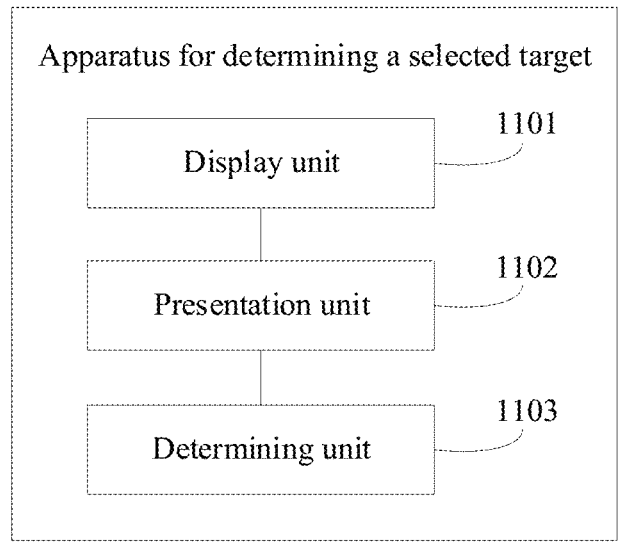
FIG. 11 is a schematic diagram of an apparatus for determining a selected target according to an embodiment of this disclosure.

Referring to FIG. 11, an embodiment of this disclosure provides an apparatus for determining a selected target. In this disclosure, a unit and a module may be hardware such as a combination of electronic circuitries; firmware; or software such as computer instructions. The unit and the module may also be any combination of hardware, firmware, and software. In some implementation, a unit may include at least one module. The apparatus includes:

a display unit 1101, configured to display a thumbnail map, the thumbnail map displaying at least one target;

a presentation unit 1102, configured to independently present, based on a trigger instruction for a first stack response area in the thumbnail map, at least two stacked targets corresponding to the first stack response area in a target presentation menu, the first stack response area being a combined area of trigger response areas respectively corresponding to the at least two stacked targets in the thumbnail map; and a determining unit 1103, configured to determine a first target independently presented in the target presentation menu as a selected target based on a trigger instruction for the first target, the first target being one of the at least two stacked targets.

Figure 12:
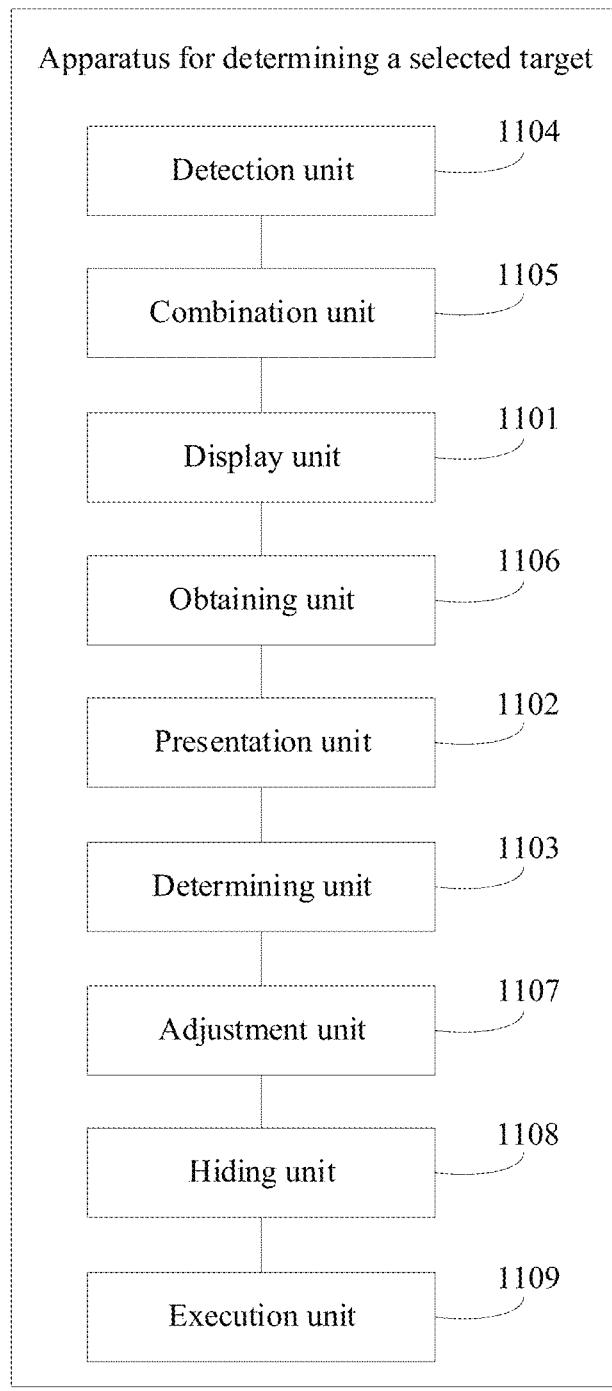
FIG. 12 is a schematic diagram of another apparatus for determining a selected target according to an embodiment of this disclosure.

In a possible implementation, referring to FIG. 12, the apparatus further includes:

a detection unit 1104, configured to perform stack detection on the at least one target to obtain at least one stacked target group, where one stacked target group includes at least two stacked targets;

a combination unit 1105, configured to combine trigger response areas respectively corresponding to at least two stacked targets in the stacked target group in the thumbnail map, to obtain a stack response area corresponding to the stacked target group; and an obtaining unit 1106, configured to obtain the trigger instruction for the first stack response area in the thumbnail map in response to detection of a trigger operation performed on the first stack response area of at least one stack response area respectively corresponding to the at least one stacked target group.

In a possible implementation, the detection unit 1104 is further configured to: select any one of the at least one target as an initial target, and in response to that at least one target other than the initial target includes a target satisfying a condition of stacking with the initial target, use the target satisfying the condition of stacking with the initial target as a first-level stacked target corresponding to the initial target; in response to that at least one target other than the initial target and each level of stacked target corresponding to the initial target includes a target satisfying a condition of stacking with a previous-level stacked target corresponding to the initial target, use the target satisfying the condition of stacking with the previous-level stacked target corresponding to the initial target as a next-level stacked target corresponding to the initial target, until the at least one target other than the initial target and each level of stacked target corresponding to the initial target does not include a target satisfying the condition of stacking with the previous-level stacked target corresponding to the initial target, and obtain a stacked target group based on the initial target and each level of stacked target corresponding to the initial target; and select any one of at least one target other than targets included in the obtained stacked target group as an updated initial target, and continue to obtain a stacked target group until a stack detection termination condition is satisfied, to obtain the at least one stacked target group.

In a possible implementation, the detection unit 1104 is further configured to: in response to that a distance between a second target and the initial target is less than a reference value, determine the second target as the target satisfying the condition of stacking with the initial target, where the reference value is a sum of a display radius of the second target in the thumbnail map and a display radius of the initial target in the thumbnail map, and the second target is any one of at least one target other than the initial target.

In a possible implementation, the obtaining unit 1106 is further configured to: in response to detection of a sliding operation from an initial trigger point to a reference trigger point corresponding to the first target, obtain a trigger instruction for the first target, where the initial trigger point is a trigger point corresponding to the trigger operation performed on the first stack response area, and the reference trigger point is any trigger point in a trigger response area corresponding to the first target in the target presentation menu.

In a possible implementation, the determining unit 1103 is further configured to determine display levels respectively corresponding to the at least two stacked targets corresponding to the first stack response area; and the presentation unit 1102 is further configured to independently present the at least two stacked objects in the target presentation menu based on the display levels respectively corresponding to the at least two stacked objects.

In a possible implementation, referring to FIG. 12, the apparatus further includes:

an adjustment unit 1107, configured to: adjust a presentation state of the selected target in the target presentation menu to a first selected state; and adjust a display state of the selected target in the thumbnail map to a second selected state.

In a possible implementation, referring to FIG. 12, the apparatus further includes:

a hiding unit 1108, configured to hide the target presentation menu based on a hiding instruction for the target presentation menu.

In a possible implementation, the display unit 1101 is further configured to display at least one candidate operation corresponding to the selected target.

Referring to FIG. 12, the apparatus further includes:

an execution unit 1109, configured to perform a reference operation of the at least one candidate operation based on a selection instruction for the reference operation.

In the embodiments of this application, based on the trigger instruction for the stack response area, the target presentation menu independently presents stacked targets corresponding to the stack response area, and then a triggered target of the independently presented targets is determined as a selected target. In this process, a target independently presented in the target presentation menu can be accurately selected, and it is very accurate to determine a triggered target of the independently presented targets as a selected target.

The apparatus provided in the foregoing embodiments implements functions of the apparatus, the division of the foregoing functional units is merely an example for description. In the practical application, the functions may be assigned to and completed by different functional units according to the requirements, that is, the internal structure of the device is divided into different functional units, to implement all or some of the functions described above. In addition, the apparatus and method embodiments provided in the foregoing embodiments belong to the same conception. For the specific implementation process, reference may be made to the method embodiments, and details are not described herein again.

Figure 13:
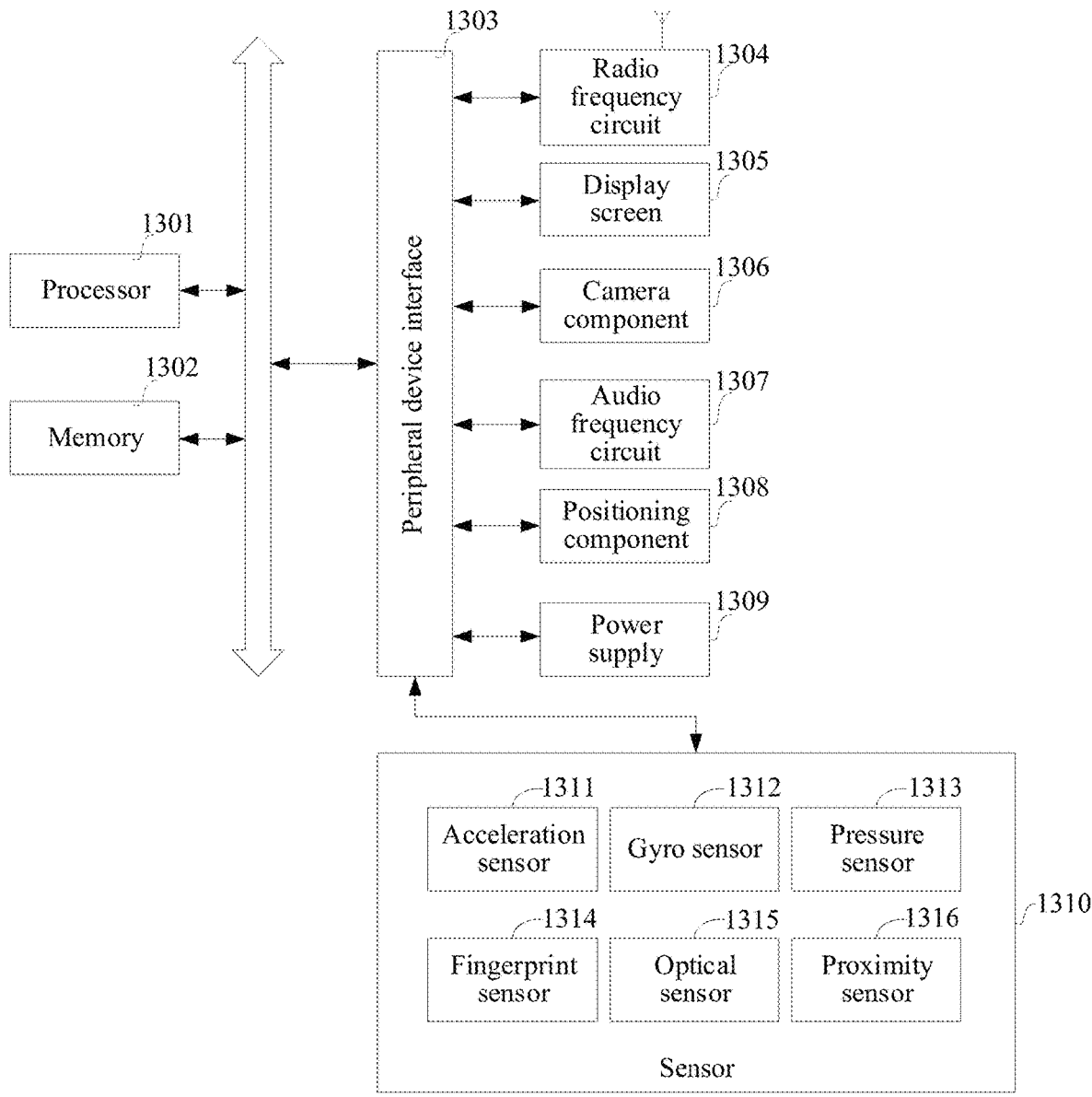
FIG. 13 is a schematic structural diagram of a device for determining a selected target according to an embodiment of this disclosure.

FIG. 13 is a schematic structural diagram of a device for determining a selected target according to an embodiment of this disclosure. The device may be a terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal may also be referred to as user equipment, a portable terminal, a laptop terminal, or a desktop terminal, among other names.

Generally, the terminal includes a processor 1301 and a memory 1302.

The processor 1301 may include one or more processing cores, and may be, for example, a 4-core processor or an 8-core processor. The processor 1301 may be implemented in at least one hardware form of digital signal processing (DSP), a field programmable gate array (FPGA), and a programmable logic array (PLA). The processor 1301 may alternatively include a main processor and a coprocessor. The main processor is configured to process data in an awake state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process a computing operation related to machine learning.

The memory 1302 may include one or more non-transitory computer-readable storage media. The non-transitory computer-readable storage media may be non-transient. The memory 1302 may further include a high-speed RAM, and a non-volatile memory such as one or more magnetic disk storage devices and a flash storage device. In some embodiments, a non-transitory computer-readable storage medium in the memory 1302 is configured to store at least one instruction. The at least one instruction is executed by the processor 1301 to implement the method for determining a selected target provided in the method embodiments of this application.

In some embodiments, the terminal may further include a peripheral interface 1303 and at least one peripheral. The processor 1301, the memory 1302, and the peripheral interface 1303 may be connected by using a bus or a signal cable. Each peripheral may be connected to the peripheral interface 1303 by using a bus, a signal cable, or a circuit board. Specifically, the peripheral includes: at least one of a radio frequency circuit 1304, a display screen 1305, a camera component 1306, an audio circuit 1307, a positioning component 1308, and a power supply 1309.

The peripheral interface 1303 may be configured to connect at least one input/output (I/O)-related peripheral to the processor 1301 and the memory 1302. In some embodiments, the processor 1301, the memory 1302, and the peripheral interface 1303 are integrated on the same chip or the same circuit board. In some other embodiments, any or both of the processor 1301, the memory 1302, and the peripheral interface 1303 may be implemented on an independent chip or circuit board, which is not limited in this embodiment.

The radio frequency circuit 1304 is configured to receive and transmit a radio frequency (RF) signal, which is also referred to as an electromagnetic signal. The radio frequency circuit 1304 communicates with a communication network and other communication devices through the electromagnetic signal. The radio frequency circuit 1304 converts an electrical signal into an electromagnetic signal for transmission, or converts a received electromagnetic signal into an electrical signal. Optionally, the radio frequency circuit 1304 includes: an antenna system, an RF transceiver, one or more amplifiers, a tuner, an oscillator, a digital signal processor, a codec chip set, a subscriber identity module card, and the like. The radio frequency circuit 1304 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 1304 may further include a circuit related to near field communication (NFC). This is not limited in this application.

The display screen 1305 is configured to display a user interface (UI). The UI may include a graphic, a text, an icon, a video, and any combination thereof. When the display screen 1305 is a touchscreen, the display screen 1305 is further capable of acquiring a touch signal on or above a surface of the display screen 1305. The touch signal may be inputted into the processor 1301 as a control signal for processing. In this case, the display screen 1305 may be further configured to provide a virtual button and/or a virtual keyboard, which is also referred to as a soft button and/or a soft keyboard. In some embodiments, there may be one display screen 1305, disposed on a front panel of the terminal. In some other embodiments, there may be at least two display screens 1305, disposed on different surfaces of the terminal respectively or in a folded design. In some other embodiments, the display screen 1305 may be a flexible display screen disposed on a curved surface or a folded surface of the terminal. Even, the display screen 1305 may be further set to have a non-rectangular irregular pattern, that is, a special-shaped screen. The display screen 1305 may be prepared by using materials such as a liquid-crystal display (LCD), an organic light-emitting diode (OLED), or the like.

The camera component 1306 is configured to acquire an image or a video. Optionally, the camera component 1306 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blurring function through fusion of the main camera and the depth-of-field camera, panoramic photographing and virtual reality (VR) photographing through fusion of the main camera and the wide-angle camera, or other fusion photographing functions. In some embodiments, the camera component 1306 may further include a flash. The flash may be a single color temperature flash or a double color temperature flash. The double color temperature flash refers to a combination of a warm light flash and a cold light flash, and may be used for light compensation under different color temperatures.

The audio circuit 1307 may include a microphone and a speaker. The microphone is configured to acquire sound waves of a user and an environment, and convert the sound waves into an electrical signal to input to the processor 1301 for processing, or input to the radio frequency circuit 1304 for implementing voice communication. For the purpose of stereo sound collection or noise reduction, there may be a plurality of microphones, respectively disposed at different portions of the terminal. The microphone may be alternatively a microphone array or an omnidirectional acquisition microphone. The speaker is configured to convert electric signals from the processor 1301 or the radio frequency circuit 1304 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 1307 may also include an earphone jack.

The positioning component 1308 is configured to position a current geographic location of the terminal, to implement a navigation or a location based service (LBS). The positioning component 1308 may be a positioning component based on the global positioning system (GPS) of the United States, the COMPASS System of China, the GLONASS System of Russia, or the GALILEO System of the European Union.

The power supply 1309 is configured to supply power to components in the terminal. The power supply 1309 may be an alternating current, a direct current, a primary battery, or a rechargeable battery. When the power supply 1309 includes the rechargeable battery, the rechargeable battery may be a wired rechargeable battery or a wireless rechargeable battery. The rechargeable battery may be further configured to support a fast charge technology.

In some embodiments, the terminal further includes one or more sensors 1310. The one or more sensors 1310 include, but are not limited to: an acceleration sensor 1311, a gyro sensor 1312, a pressure sensor 1313, a fingerprint sensor 1314, an optical sensor 1315, and a proximity sensor 1316.

The acceleration sensor 1311 may detect acceleration sizes on three coordinate shafts of a coordinate system established based on the terminal. For example, the acceleration sensor 1311 may be configured to detect components of gravity acceleration on three coordinate shafts. The processor 1301 may control, according to a gravity acceleration signal collected by the acceleration sensor 1311, the touch display screen 1305 to display the UI in a landscape view or a portrait view. The acceleration sensor 1311 may be further configured to acquire motion data of a game or a user.

The gyroscope sensor 1312 may detect a body direction and a rotation angle of the terminal, and the gyroscope sensor 1312 may work with the acceleration sensor 1311 to acquire a 3D action performed by the user on the terminal. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed at a side frame of the terminal and/or a lower layer of the display screen 1305. In a case that the pressure sensor 1313 is disposed at the side frame of the terminal, a holding signal of the user for the terminal can be detected for the processor 1301 to perform left and right hand recognition or quick operations according to the holding signal acquired by the pressure sensor 1313. When the pressure sensor 1313 is disposed on the low layer of the display screen 1305, the processor 1301 controls, according to a pressure operation of the user on the display screen 1305, an operable control on the UI. The operable control includes at least one of a button control, a scroll-bar control, an icon control, and a menu control.

The fingerprint sensor 1314 is configured to collect a fingerprint of the user, and the processor 1301 recognizes an identity of the user according to the fingerprint collected by the fingerprint sensor 1314, or the fingerprint sensor 1314 recognizes the identity of the user according to the collected fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front surface, a back surface, or a side surface of the terminal. When a physical button or a vendor logo is disposed on the terminal, the fingerprint sensor 1314 may be integrated with the physical button or the vendor logo.

The optical sensor 1315 is configured to acquire ambient light intensity. In an embodiment, the processor 1301 may control display luminance of the display screen 1305 according to the ambient light intensity collected by the optical sensor 1315. Specifically, in a case that the ambient light intensity is relatively high, the display brightness of the display screen 1305 is increased. In a case that the ambient light intensity is relatively low, the display brightness of the display screen 1305 is reduced. In another embodiment, the processor 1301 may further dynamically adjust a camera parameter of the camera component 1306 according to the ambient light intensity acquired by the optical sensor 1315.

The proximity sensor 1316 is also referred to as a distance sensor and is generally disposed at the front panel of the terminal. The proximity sensor 1316 is configured to acquire a distance between the user and the front face of the terminal. In an embodiment, when the proximity sensor 1316 detects that the distance between the user and the front surface of the terminal gradually becomes small, the touch display screen 1301 is controlled by the processor 1305 to switch from a screen-on state to a screen-off state. When the proximity sensor 1316 detects that the distance between the user and the front surface of the terminal gradually increases, the display screen 1305 is controlled by the processor 1301 to switch from the screen-off state to the screen-on state.

A person skilled in the art may understand that the structure shown in FIG. 13 does not constitute a limitation to the terminal, and the terminal may include more or fewer components than those shown in the figure, or some components may be combined, or a different component deployment may be used.

An exemplary embodiment further provides a computer device. The computer device includes a processor and a memory. The memory stores at least one piece of program code. The at least one piece of program code is loaded and executed by one or more processors, to cause the computer device to implement any one of the foregoing methods for determining a selected target.

An exemplary embodiment further provides a non-transitory computer-readable storage medium, storing at least one piece of program code, the at least one piece of program code being loaded and executed by a processor of a computer device to cause a computer to implement any one of the foregoing methods for determining a selected target.

In a possible implementation, the non-transitory computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is provided. The computer program product or the computer program includes computer instructions, and the computer instructions are stored in a non-transitory computer-readable storage medium. A processor of a computer device reads the computer instructions from the non-transitory computer-readable storage medium and executes the computer instructions, to cause the computer device to perform any one of the foregoing methods for determining a selected target.

The specification and claims of this application, and terms "first" and "second" are used to distinguish similar objects, but are unnecessarily used to describe a specific sequence or order. The data termed in such a way are interchangeable in proper circumstances, so that the embodiments of this application described herein can be implemented in orders other than the order illustrated or described herein. The implementations described in the foregoing exemplary embodiments do not represent all implementations that are consistent with this application. On the contrary, the implementations are merely examples of apparatuses and methods that are described in detail in the appended claims and that are consistent with some aspects of this application.

It is to be understood that "plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application.

What is claimed is:

1. A method for determining a selected target, performed by a terminal, comprising:
    displaying a thumbnail map, the thumbnail map displaying a plurality of targets, the plurality of targets comprising at least two stacked targets that overlap with each other;
    based on a trigger instruction targeting a combined stack response area in the thumbnail map, presenting the at least two stacked targets in a target presentation menu, such that there is no overlap among the at least two stacked targets, the combined stack response area being a combined area of trigger response areas respectively corresponding to the at least two stacked targets in the thumbnail map;
    in response to detecting a dragging operation starting from an initial trigger point in the combined stack response area in the thumbnail map and ending at a reference trigger point targeting a first target in the target presentation menu, determining the first target as the selected target, wherein the first target is one of the at least two stacked targets;
    displaying at least one candidate operation corresponding to the selected target; and
    performing a reference operation of the at least one candidate operation based on a selection instruction for the reference operation.

2. The method according to claim 1, wherein before presenting the at least two stacked targets in the combined stack response area, the method further comprises:
    performing stack detection to obtain a stacked target group, wherein the stacked target group comprises the at least two stacked targets;
    combining trigger response areas corresponding to each of the at least two stacked targets in the stacked target group in the thumbnail map, to obtain the combined stack response area; and
    obtaining the trigger instruction targeting the combined stack response area in the thumbnail map in response to detecting a trigger operation performed on the combined stack response area.

3. The method according to claim 2, wherein performing the stack detection to obtain the stacked target group comprises performing an iteration starting from round 1:
    in response to a current iteration being round 1:
        selecting any one of the plurality of targets as an initial target;
        forming a candidate target group which contains all the plurality of targets except the initial target;
        for each candidate target selected from the candidate target group: in response to the each candidate target satisfying a condition of stacking with the initial target, determining the each candidate target as a first-level stacked target corresponding to the initial target; and
        forming the stacked target group by adding the initial target and all first-level stacked targets; and
    in response to a current iteration being round n, n being greater than 1:
        updating the candidate target group by removing (n-1)th-level stacked targets identified in a previous round of iteration;
        for each candidate target selected from the candidate target group: in response to the each candidate target satisfying the condition of stacking with one of the (n-1)th-level stacked targets, determining the each candidate target as a nth-level stacked target corresponding to the initial target;
        updating the stacked target group by adding all nth-level stacked targets; and
        in response to no candidate target satisfying the condition of stacking with the one of the (n-1)th-level stacked targets, ending the iteration.

4. The method according to claim 3, wherein, in response to the each candidate target satisfying the condition of stacking with the initial target, determining the each candidate target as the first-level stacked target corresponding to the initial target comprises:
  in response to that a distance between the candidate target and the initial target is less than a reference value, determining the candidate target as the target satisfying the condition of stacking with the initial target, wherein the reference value is a sum of a display radius of the candidate target in the thumbnail map and a display radius of the initial target in the thumbnail map.

5. The method according to claim 1, wherein presenting the at least two stacked targets in the combined stack response area comprises:
  determining display levels respectively corresponding to the at least two stacked targets in the combined stack response area; and
  presenting, without overlap, the at least two stacked targets in the target presentation menu based on the display levels respectively corresponding to the at least two stacked targets.

6. The method according to claim 1, wherein after determining the first target presented in the target presentation menu as the selected target based on the trigger instruction targeting the first target, the method further comprises:
  adjusting a presentation state of the selected target in the target presentation menu to a first selected state; and
  adjusting a display state of the selected target in the thumbnail map to a second selected state.

7. The method according to claim 1, wherein after determining the first target presented in the target presentation menu as the selected target based on the trigger instruction targeting the first target, the method further comprises:
  hiding the target presentation menu based on a hiding instruction for the target presentation menu.

8. A device comprising a memory for storing computer instructions and a processor in communication with the memory, wherein, when the processor executes the computer instructions, the processor is configured to cause the device to:
  display a thumbnail map, the thumbnail map displaying a plurality of targets the plurality of targets comprising at least two stacked targets that overlap with each other;
  based on a trigger instruction targeting a combined stack response area in the thumbnail map, present the at least two stacked targets in a target presentation menu, such that there is no overlap among the at least two stacked targets, the combined stack response area being a combined area of trigger response areas respectively corresponding to the at least two stacked targets in the thumbnail map;
  in response to detecting a dragging operation starting from an initial trigger point in the combined stack response area in the thumbnail map and ending at a reference trigger point targeting a first target in the target presentation menu, determine the first target as a selected target, wherein the first target is one of the at least two stacked targets;
  display at least one candidate operation corresponding to the selected target; and
  perform a reference operation of the at least one candidate operation based on a selection instruction for the reference operation.

9. The device according to claim 8, wherein, before the processor is configured to cause the device to present the at least two stacked targets in the combined stack response area, the processor is configured to further cause the device to:
  perform stack detection to obtain a stacked target group, wherein the stacked target group comprises the at least two stacked targets;
  combine trigger response areas corresponding to each of the at least two stacked targets in the stacked target group in the thumbnail map, to obtain the combined stack response area; and
  obtain the trigger instruction targeting the combined stack response area in the thumbnail map in response to detecting a trigger operation performed on the combined stack response area.

10. The device according to claim 9, wherein, when the processor is configured to cause the device to perform the stack detection to obtain the stacked target group, the processor is configured to cause the device to perform an iteration starting from round 1:
  in response to a current iteration being round 1:
    select any one of the plurality of targets as an initial target;
    form a candidate target group which contains all the plurality of targets except the initial target;
    for each candidate target selected from the candidate target group: in response to the each candidate target satisfying a condition of stacking with the initial target, determine the each candidate target as a first-level stacked target corresponding to the initial target; and
    form the stacked target group by adding the initial target and all first-level stacked targets; and
  in response to a current iteration being round n, n being greater than 1:
    update the candidate target group by removing (n-1)th-level stacked targets identified in a previous round of iteration;
    for each candidate target selected from the candidate target group in response to the each candidate target satisfying the condition of stacking with one of the (n-1)th-level stacked targets, determine the each candidate target as a nth-level stacked target corresponding to the initial target;
    update the stacked target group by adding all nth-level stacked targets; and
    in response to no candidate target satisfying the condition of stacking with the one of the (n-1)th-level stacked targets, end the iteration.

11. The device according to claim 10, wherein, when the processor is configured to cause the device to: in response to the each candidate target satisfying the condition of stacking with the initial target, determine the each candidate target as the first-level stacked target corresponding to the initial target, the processor is configured to cause the device to:
  in response to that a distance between the candidate target and the initial target is less than a reference value, determine the candidate target as the target satisfying the condition of stacking with the initial target, wherein the reference value is a sum of a display radius of the candidate target in the thumbnail map and a display radius of the initial target in the thumbnail map.

12. The device according to claim 8, wherein, when the processor is configured to cause the device to present the at least two stacked targets in the combined stack response area, the processor is configured to cause the device to:

determine display levels respectively corresponding to the at least two stacked targets in the combined stack response area; and present, without overlap, the at least two stacked targets in the target presentation menu based on the display levels respectively corresponding to the at least two stacked targets.

13. The device according to claim 8, wherein, after the processor is configured to cause the device to determine the first target presented in the target presentation menu as the selected target based on the trigger instruction targeting the first target, the processor is configured to further cause the device to:

adjust a presentation state of the selected target in the target presentation menu to a first selected state; and adjust a display state of the selected target in the thumbnail map to a second selected state.

14. The device according to claim 8, wherein, after the processor is configured to cause the device to determine the first target presented in the target presentation menu as the selected target based on the trigger instruction targeting the first target, the processor is configured to further cause the device to:

hide the target presentation menu based on a hiding instruction for the target presentation menu.

15. A non-transitory storage medium for storing computer readable instructions, the computer readable instructions, when executed by a processor, causing the processor to:

display a thumbnail map, the thumbnail map displaying a plurality of targets, the plurality of targets comprising at least two stacked targets that overlap with each other;

based on a trigger instruction targeting a combined stack response area in the thumbnail map, presenting the at least two stacked targets in a target presentation menu, such that there is no overlap among the at least two stacked targets, the combined stack response area being a combined area of trigger response areas respectively corresponding to the at least two stacked targets in the thumbnail map;

in response to detecting a dragging operation starting from an initial trigger point in the combined stack response area in the thumbnail map and ending at a reference trigger point targeting a first target in the target presentation menu, determine the first target as a selected target, wherein the first target is one of the at least two stacked targets;

display at least one candidate operation corresponding to the selected target; and perform a reference operation of the at least one candidate operation based on a selection instruction for the reference operation.

16. The non-transitory storage medium according to claim 15, wherein, before the computer readable instructions cause the processor to present the at least two stacked targets in the combined stack response area, the computer readable instructions further cause the processor to:

perform stack detection to obtain a stacked target group, wherein the stacked target group comprises the at least two stacked targets;

combine trigger response areas corresponding to each of the at least two stacked targets in the stacked target group in the thumbnail map, to obtain the combined stack response area; and obtain the trigger instruction targeting the combined stack response area in the thumbnail map in response to detecting a trigger operation performed on the combined stack response area.

* * * * *